Goodwin & Bennett,
Bread Machine.

No. 89,653.          Patented May 4, 1869.

WITNESSES:

INVENTOR:
H. Goodwin & C. H. Bennett 2nd
per attorney

HARMON GOODWIN AND CHARLES H. BENNETT, 2D, OF SOUTH BERWICK JUNCTION, MAINE.

Letters Patent No. 89,653, dated May 4, 1869.

IMPROVED DOUGH-ROLLING MACHINE.

The Schedule referred to in these Letters Patent and making part of the same.

*To all whom it may concern:*

Be it known that we, HARMON GOODWIN and CHARLES H. BENNETT, 2d, of South Berwick Junction, York county, Maine, have invented a new and improved Dough-Rolling Machine; and we do hereby declare that the following is a full, clear, and exact description thereof, which will enable others skilled in the art to make and use the same, reference being had to the accompanying drawings, forming part of this specification.

This invention relates to improvements in apparatus for rolling dough into thin sheets for pie-crust, and also laying it upon the top of a pie, or in a vessel, as may be required, as will be hereinafter described.

Similar letters of reference indicate corresponding parts.

A represents a frame, to be made of any suitable material, and adapted to be placed on a table, and supporting two rollers, the one, B, provided with a hand-crank, and fixed in the housings by a solid bearing at one end, and working on the point of a spindle at the other, screwed through the housing to permit the ready removal of the roller, if required.

Figure 1:
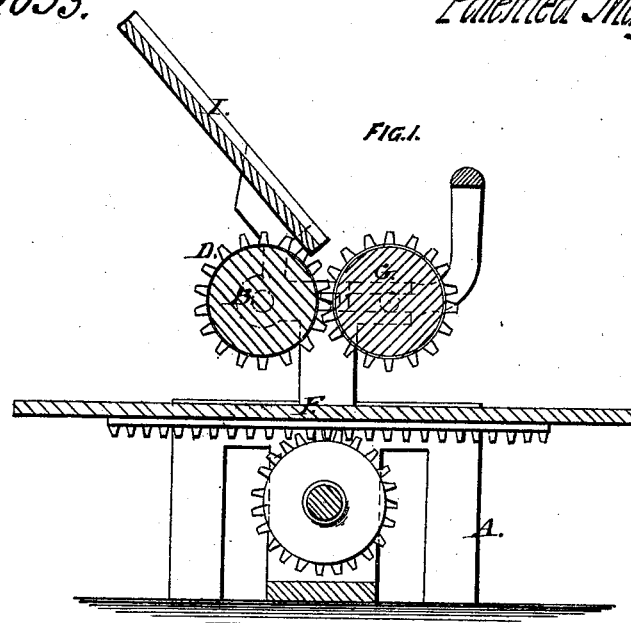
Figure 1 represents a longitudinal sectional elevation of our improved machine.
Figure 2:
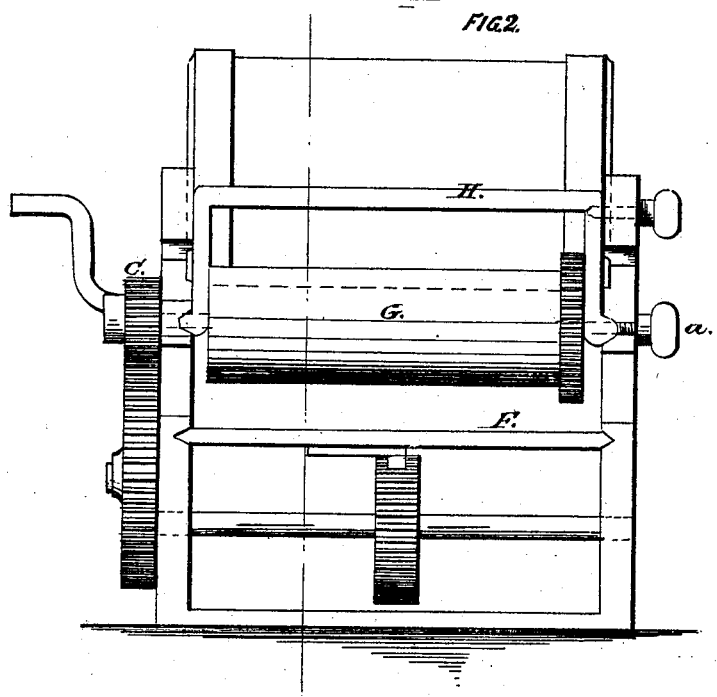
Figure 2 represents a front elevation of the same.

The said roller is also provided with pinions C and D, the one gearing into a wheel, E, working a reciprocating table, F, under the rollers, and the other gearing into a corresponding pinion on the other roller, G, which is attached to a bent support, H, arranged to slide to or from the roller B, in the bifurcated housings, as represented in dotted lines in fig. 1.

I represents a feeding-table, also detachably connected to the frame, from which the dough may be fed to the rollers, and the latter may be adjusted to roll it to any desired thickness.

As the rollers are set into motion, the table will also move, and the sheet of dough passing through will be laid smoothly thereon, or on any vessel, plate, or other article placed on the table to receive it.

Having thus described our invention,

What we claim as new, and desire to secure by Letters Patent, is—

The combination of the crank-roller B, supported at one end, on the screw-spindle *a*, with the roller G, laterally adjustable by means of the bent bars H and the table I, when made removable, as set forth.

HARMON GOODWIN.
CHARLES H. BENNETT, 2D.

Witnesses:
STEPHEN J. NASON,
MOSES BENNETT.